United States Patent
Wogerbauer

[11] 3,713,205
[45] Jan. 30, 1973

[54] PROCESS FOR THE PRODUCTION OF SECTIONS

[75] Inventor: Alfred Wogerbauer, Linz, Austria

[73] Assignee: Vereinigte Osterreichische Eisen- und Stahlwerke Aktiengesellschaft, Linz, Austria

[22] Filed: Dec. 3, 1970

[21] Appl. No.: 94,681

[30] Foreign Application Priority Data

Dec. 5, 1969 Austria.....................................11353

[52] U.S. Cl.....................29/480, 29/155 R, 29/475
[51] Int. Cl..............................................B23k 31/02
[58] Field of Search.........29/480, 155 R, 155 C, 475, 29/471 D, 471.3

[56] References Cited

UNITED STATES PATENTS

| | | | |
|---|---|---|---|
| 3,413,437 | 11/1968 | Hamamoto et al. | 29/480 X |
| 3,460,235 | 8/1969 | Roberts et al. | 29/480 X |
| 3,587,198 | 6/1971 | Hensel | 29/480 X |
| 2,106,602 | 1/1938 | Hunter | 29/155 C |
| 3,477,485 | 11/1969 | Talbott | 29/155 R |

*Primary Examiner*—J. Spencer Overholser
*Assistant Examiner*—Richard Bernard Lazarus
*Attorney*—Brumbaugh, Graves, Donohue & Raymond

[57] ABSTRACT

The disclosure relates to a process for producing girders in the shape of flanged sections, in particular T- or I-beams, in which at least one edge of the web is welded to the broad surface of at least one flange, wherein the improvement resides in that at least one flange is bent up on both sides of the predetermined welding seam line against the contraction angle to be expected during welding, by an angle which is greater than this contraction angle, and the flanges of the formed beam are bent back after welding into the desired position. This process has the advantage that one is independent from deformations in the welding machine, and that contraction stresses are eliminated.

2 Claims, 7 Drawing Figures

PATENTED JAN 30 1973　　　3,713,205

INVENTOR.
ALFRED WÖGERBAUER
BY his ATTORNEYS
Brumbaugh, Graves,
Donohue & Raymond

PROCESS FOR THE PRODUCTION OF SECTIONS

The invention relates to a process for the production of girders comprising an intermediate web and flanges, in particular T or I-beams, in which at least one edge of the web is welded to the broad surface of at least one flange.

Welded girders compete in buildings above ground with beams produced by hot-rolling. They excel by a number of advantages as compared to hot-rolled beams. They may be produced with longer or shorter webs in any desired scale, because the dimensions may be chosen more freely than is the case with hot-rolled beams. The devices for producing welded beams are comparatively inexpensive; a change-over from one to the other gauge is rapidly achieved; a further advantage may also be seen in the fact that it is possible to produce welded beams which weigh less than comparable hot-rolled beams.

A difficulty which occurs when a web edge is welded together with the face of a flange resides in that the flange is deformed by contractive strain upon cooling of the produced T or I-shaped beam, the deformation residing in the tendency of the flanges on both sides towards the welding seam by a specific angle, the so-called contraction angle. Thus, a rather difficult straightening procedure becomes necessary after the welding process. In this straightening process the flanges have to be bent against the deformation which causes additional stresses in the welding seam at the transition from the web to the flange. Such sections cannot be used for application fields in which they are exposed to varying stresses.

The invention is aimed at avoiding the described disadvantages and difficulties and resides in a process of the kind referred to in the introductory part, in that the at least one flange is bent up on both sides of the predetermined welding seam line against the contraction angle to be expected during welding by an angle which is grater than this contraction angle, and that the flanges of the formed carrier, in particular I or T-beams, are bent back after welding into the desired position.

The flanges or the web may be plane (level). According to a preferred embodiment they may alternatively be provided with cold rolled grooves. Thus it is possible to increase the strength properties which are, in general, low with adequately weldable materials; in particular it is possible to increase the yield point in this manner. This is known per se, e.g. from the U.S. Pat. Nos. 3,165,816 and 3,273,976, the British Patent specifications Nos. 989,027 and 1,063,783 and from the Canadian Pat. specification No. 703,574 of Applicant. The cold-rolled strengthening grooves may be arranged either in longitudinal or transverse direction of the web. Strengthening grooves in longitudinal direction of the web are advantageous when axial forces are to be absorbed. Transversely arranged strengthening grooves are chosen in the case of bending stresses, particularly when relatively high transverse forces are to be absorbed.

The feature of choosing the bending up angle greater than the contraction angle to be expected followed by bending back into the desired position has the advantage that one is independent from deformations in the welding machine, for the contraction angle depends, amongst other factors, on the welding temperature. If during welding a greater contraction angle than expected were obtained as a result of too high temperatures, tension stresses would be created during straightening instead of pressure stresses and an undesired notch force would be exerted on the welding seam. For bending back the flanges into the desired position, preferably pressure bodies formed as rollers are used which are acting from the outside of the flanges.

The process of the invention is generally applicable. It may be applied both for I and T-beams comprising plane webs and flanges in which the transition between the web and flanges, where the welding seam is situated, is formed by a right angle, and for carriers in which the flanges are provided in longitudinal direction with an undulation or groove which is welded on its convex side to the web edge.

In order that the invention may be more fully understood it shall now be explained with reference to the accompanying drawings illustrating several embodiments.

Figure 1:
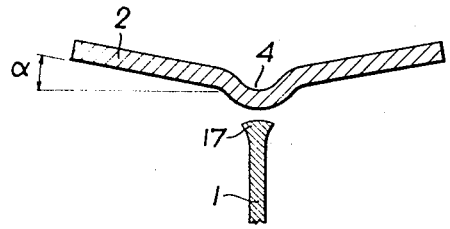
FIGS. 1 to 5 illustrate how a web edge is welded with a flange and how the flanges of a finished section are straightened.

FIG. 1 illustrates the preparation of a web 1 with a flange 2 for welding. The web edge may be deformed as shown at 17; the flange may be provided with a corrugation 4 in longitudinal direction so that the convex side of the corrugation faces the web edge. As indicated in FIG. 1, the flange 2 is bent up by the angle $\alpha$ around its axis of symmetry or around the predetermined welding seam line against the contraction angle to be expected.

Figure 2:
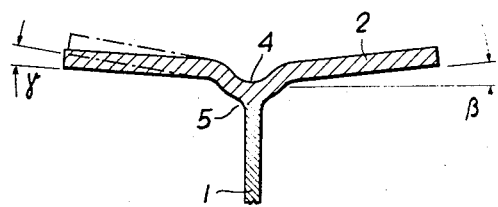

FIG. 2 shows the web 1 and the flange 2 after welding and cooling, wherein the expected contraction has occurred. By this contraction the flange 2 was bent back by the angle $\gamma$ towards the horizontal direction; the remaining angle $\beta$ (bending back angle) is brought to the value 0 by a subsequent straightening process.

Figure 3:
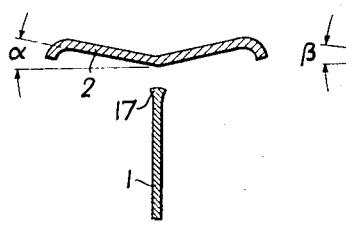
Figure 4:
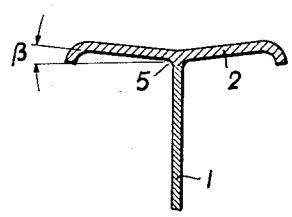
Figure 5:
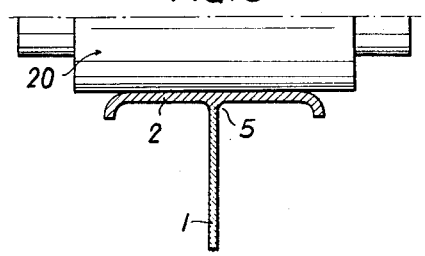

FIGS. 3 and 4 are similar illustrations as FIGS. 1 and 2. However, the flange 2 is formed from smooth sheet, which is without a corrugation in longitudinal direction. The flange is symmetrically bent up by the angle $\alpha$ around the longitudinal axis, similarly as described in connection with FIG. 1, so that after welding and contraction (FIG. 4) the residual angle $\beta$ remains. In FIG. 5 the straightening process is shown, in which by means of the roller 20 the flanges of the joist are bent back by the angle $\beta$ to the horizontal line, wherein the web 1 and the flanges form a right angle. Only pressure stresses may arise in the welding seam 5 but no tensile stresses.

Figure 6:
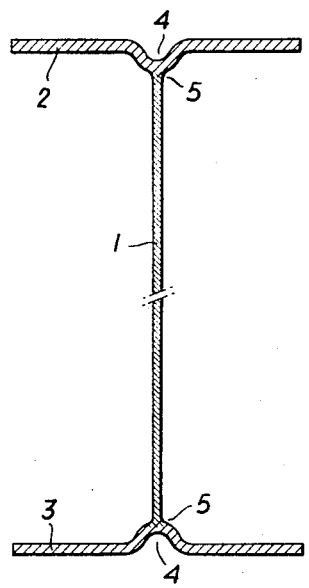
FIGS. 6 and 7 show finished beams produced by the process according to the invention.

In FIG. 6 a symmetrical I-shaped section produced by the process of the invention is shown, comprising the web 1 and two equal flanges 2, 3. Each flange is provided with a groove-shaped corrugation 4, the convex sides being connected with the edges of the web 1 by the welding seam 5.

Figure 7:
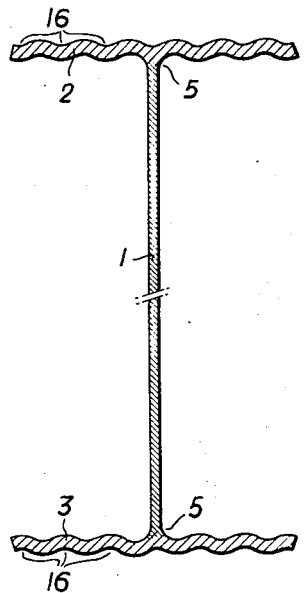

Also in FIG. 7 a symmetrical I-shaped section is shown which comprises the web 1 and two equal flanges 2 and 3. In this embodiment the flanges are provided with longitudinal grooves 16, a convex side of a groove of each the upper flange and the lower flange being connected with pertinent web edges by welding seams 5.

What I claim is:

1. In a process for producing girders, such as T and I beams and the like, having a web and at least one flange, the process having the steps of placing an edge of the web adjacent a broad surface of the flange and welding the edge of the web to the flange to form a welding seam, an improvement comprising the steps of forming the flange with the ends of the flange bent away from the predetermined welding seam before placing the flange and web together for welding by an angle greater than the expected angle of contraction of the flange after welding and bending the edges of the flange after welding toward the welding seam to form the beam into the desired shape whereby tension forces which weaken the beam are minimized.

2. The process according to claim 1 wherein rollers are used to bend the edges of the flange to form the beam into the desired shape.

* * * * *

PO-1050
(5/69)

UNITED STATES PATENT OFFICE
CERTIFICATE OF CORRECTION

Patent No. 3,713,205  Dated Jan. 30, 1973

Inventor(s) Alfred Wogerbauer

It is certified that error appears in the above-identified patent and that said Letters Patent are hereby corrected as shown below:

Col. 1, line 24, after "flanges" insert --to bend--; and

Col. 1, line 51, "3,165,816" should be --3,165,815--.

Signed and sealed this 26th day of June 1973.

(SEAL)
Attest:

EDWARD M. FLETCHER, JR.
Attesting Officer

ROBERT GOTTSCHALK
Commissioner of Patents